United States Patent
Hong et al.

(10) Patent No.: US 7,392,659 B2
(45) Date of Patent: Jul. 1, 2008

(54) DYNAMIC CONTROL OF A VARIABLE DISPLACEMENT COMPRESSOR

(75) Inventors: Kwangtaek Hong, Ann Arbor, MI (US); William L DeWitt, Ortonville, MI (US); Gary L Baker, Carleton, MI (US)

(73) Assignee: Chrysler LLC, Auburn Hills, MI (US)

( * ) Notice: Subject to any disclaimer, the term of this patent is extended or adjusted under 35 U.S.C. 154(b) by 344 days.

(21) Appl. No.: 11/021,156

(22) Filed: Dec. 22, 2004

(65) Prior Publication Data
US 2006/0130499 A1 Jun. 22, 2006

(51) Int. Cl.
F25B 49/02 (2006.01)
(52) U.S. Cl. .................... 62/115; 62/176.6; 62/228.3
(58) Field of Classification Search ............. 62/176.6, 62/176.3, 228.1, 228.3, 115; 165/293; 236/44 C
See application file for complete search history.

(56) References Cited

U.S. PATENT DOCUMENTS

| 4,790,727 A | | 12/1988 | Steele |
| 4,877,081 A | * | 10/1989 | Ohtsu ............................ 165/202 |
| 5,309,725 A | * | 5/1994 | Cayce ............................ 62/90 |
| 5,797,277 A | | 8/1998 | Hong et al. |
| 6,073,457 A | * | 6/2000 | Kampf et al. ............... 62/179 |
| 6,105,387 A | | 8/2000 | Hong et al. |
| 6,385,982 B1 | * | 5/2002 | Ota et al. ..................... 62/209 |
| 6,425,253 B1 | | 7/2002 | Gale et al. |
| 2003/0136138 A1 | * | 7/2003 | Tsuboi et al. .............. 62/228.1 |
| 2004/0144106 A1 | * | 7/2004 | Douglas et al. ............. 62/127 |

* cited by examiner

Primary Examiner—William E Tapolcai
(74) Attorney, Agent, or Firm—Ralph E. Smith

(57) ABSTRACT

Controlling displacement in a variable displacement compressor of an automobile air conditioning system entails detecting the temperature and humidity level of air entering the evaporator, setting a target air probe temperature from inside the automobile, and reading the evaporator air-out temperature at the temperature probe. From these parameters, the evaporator suction pressure can be calculated as can the load on the evaporator and the refrigerant flow rate so that the compressor swash plate angle, and thus, the compressor displacement, can be adjusted. After adjusting the compressor swash plate angle, calculating the absolute value of a difference between the actual air probe value and the vehicle occupant's air probe setting can be performed. If the absolute value is less than 0.5 degrees Fahrenheit, then the compressor stroke can be maintained, but if it is not, then the iteration must again be performed.

19 Claims, 3 Drawing Sheets

DYNAMIC CONTROL OF A VARIABLE DISPLACEMENT COMPRESSOR

FIELD OF THE INVENTION

The present invention relates to compressor control, and more specifically, to the dynamic control of a variable displacement air conditioning compressor.

BACKGROUND OF THE INVENTION

Modern air conditioning compressors are controlled in a variety of ways to deliver the desired amount of refrigerant to the evaporator. One way of controlling this amount of refrigerant is by controlling the drawing or suction pressure of the refrigerant by the compressor from the evaporator. The drawing pressure is measured in the suction line between the evaporator and the compressor, while the suction pressure control is carried out by determining the temperature of the evaporator surface in order to alter the suction pressure. When a vehicle occupant desires cooler air to be blown into the vehicle compartment, the occupant turns the blower, or fan speed, to high. This increases the air passing through the evaporator and raises the temperature of the evaporator surface, which causes the compressor to draw coolant through the evaporator for a longer period of time in order to compress enough coolant for enough time in order to meet the desired cooling level of the occupant. Likewise, when the occupant desires the blowing air to be at a temperature higher than the current blowing air temperature, the occupant reduces the fan speed or blower speed. This causes the evaporator surface temperature to become colder, which in turn signals the compressor to reduce the suction pressure and time that the compressor compresses during a given cycle. This type of system has a drawback in that it does not know how much torque the compressor absorbs from the engine. A further limitation of this system is its inability to optimize fuel economy because the compressor is always maximizing its displacement which also maximizes its horsepower draw from the engine, which supplies rotational power to the air conditioning compressor. This system fails to optimize horsepower draw from the engine, which is a minimization of that horsepower draw from the engine.

Another current air conditioning control system is a torque-controlled system that manages the engine torque consumed by the compressor. That is, within the structure of the compressor, there is a small orifice measurement device. Because of this small orifice, it is possible to obtain the pressure differential in the coolant line before and after the stroke of the compressor. Because the compressor is a variable displacement compressor, it is possible to obtain a mass flow rate differential and pressure differential of the coolant across the orifice and therefore, adjust the displacement or stroke of the compressor output accordingly.

Both of the above control methods are passive control methods. That is, neither of the above control methods measures quantities of temperature or humidity of the air passing into the evaporator. Because of this, neither system is capable of determining what mass flow rate at which to start the compressor upon start-up of the compressor when the air conditioning system is activated. After the air conditioning system is operating, the control system will know the temperature of the air coming out of the evaporator and then further adjustments can be made. Operation of the compressor during this pre-adjustment period is inefficient and consumes horsepower from the engine, thus limiting the maximum fuel economy possible.

What is needed then is a device that does not suffer from the above limitations. This in turn, will provide a device that measures the temperature and humidity of the air entering the evaporator and the temperature set within an interior of an automobile in order to initially set and subsequently adjust a compressor stroke upon start-up of the air conditioning system.

SUMMARY OF THE INVENTION

A method for controlling displacement in a variable displacement compressor of an automobile air conditioning system, where the air conditioning system includes a condenser, an evaporator, an air conditioning control head, an engine controller, and an air probe on the exit side of the evaporator entails multiple measurements and at least one comparison. The method includes the steps of detecting a temperature of air entering the evaporator and responsively producing an evaporator air-in temperature signal; detecting a humidity level of air entering the evaporator and responsively producing an evaporator air-in humidity signal; setting a target temperature of the interior air probe; reading the evaporator air-out temperature at the temperature probe; calculating the evaporator suction pressure; calculating the load on the evaporator; calculating the refrigerant flow rate; and adjusting the operational state of the compressor.

The method further entails calculating the absolute value of a difference between an actual air probe value and the target air probe temperature after adjusting the operational state of the compressor and determining if the absolute value is less than 0.5 degrees Fahrenheit. If the absolute value is less than 0.5 degrees Fahrenheit, then the compressor stroke is normally maintained. If the absolute value is not less than 0.5 degrees Fahrenheit, then the process or iteration of measurements continues to be repeated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
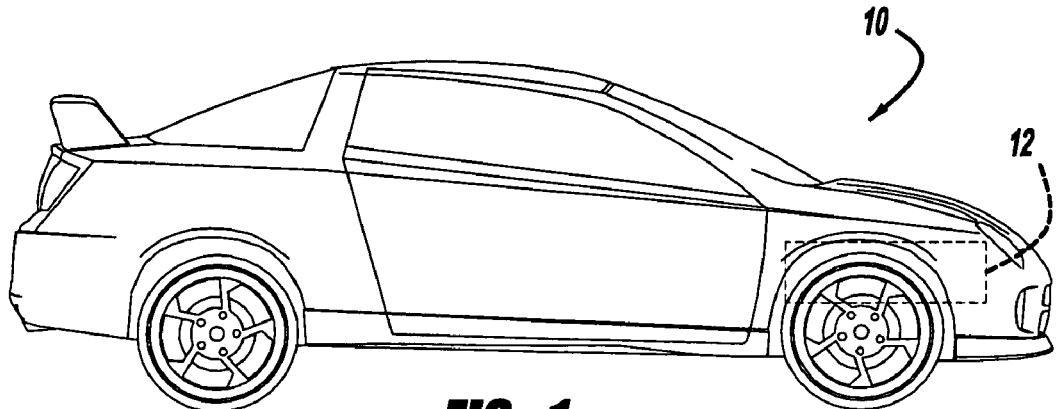
FIG. 1 is a perspective view of an automobile depicting the general location of an air conditioning system.
Figure 2:
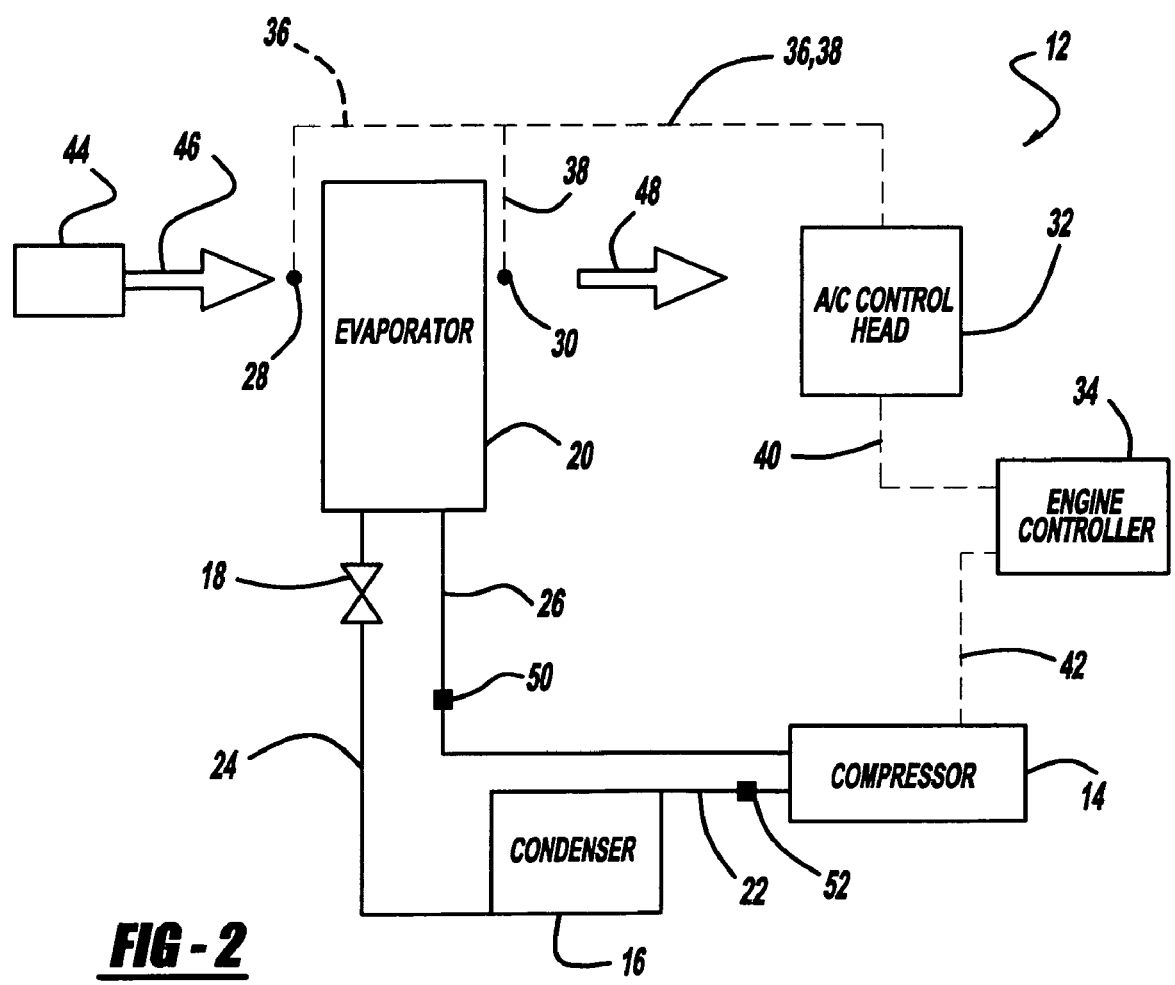
FIG. 2 is a schematic diagram of the air conditioning system of FIG. 1, according to teachings of the present invention.
Figure 3:
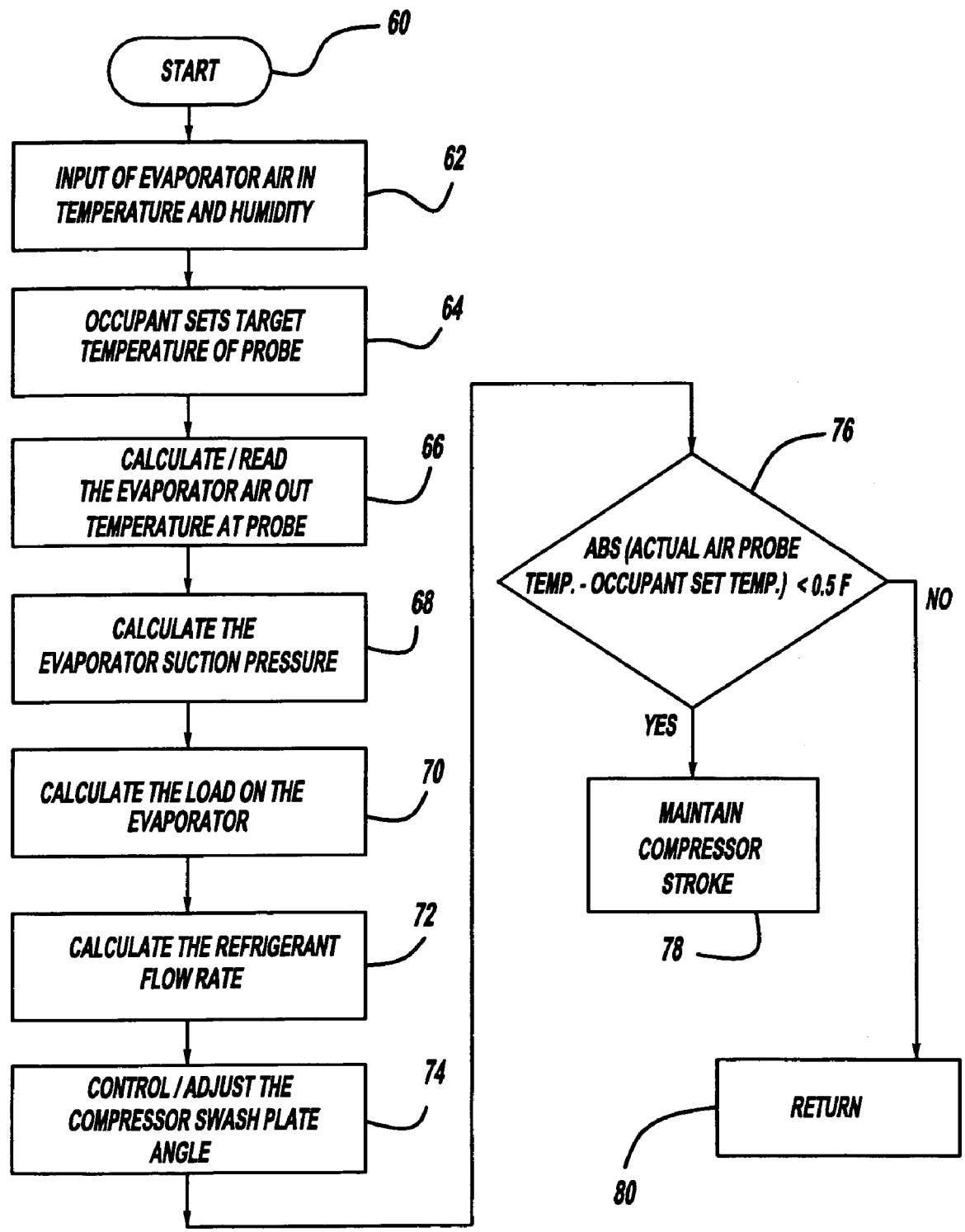
FIG. 3 is a flowchart of control of the air conditioning system of FIG. 2, according to teachings of the present invention.

The following description of the preferred embodiment is merely exemplary in nature and is in no way intended to limit the invention, its application, or uses. Turning to FIGS. 1 through 3, components and control of the air conditioning system according to teachings of the present invention will be described. With reference to FIG. 1, an air conditioning system constructed in accordance with the teachings of the present invention is generally indicated by reference numeral 12. The air conditioning system 12 is shown to include a compressor 14, a condenser 16, a throttling device 18, and an evaporator 20. Additionally, the air conditioning system 12 has a refrigerant line 22 that transports compressed refrigerant from the compressor 14 to the condenser 16, a condenser to evaporator refrigerant line 24, and an evaporator to compressor refrigerant line 26.

The compressor 14, according to teachings of the present invention, is a continuously variable swash plate compressor that is capable of having its swash plate angle, and thus, its stroke adjusted to cause adjustment in the quantity of the coolant compressed in the system 12 by adjusting the compressor displacement. That is, by adjusting the operational state of the compressor by adjusting the swash plate angle of the compressor, the quantity of coolant compressed by the system 12 can be altered. Additionally, the air conditioning system has components that are used to control the compressor 14 and the operative workings of the system 12. These components include a temperature and humidity sensor 28, a temperature probe 30, an air conditioning control head 32, and an engine controller 34. Connecting the temperature and humidity sensor 28 to the A/C control head 32 there is a control line 36; connecting the temperature probe 30 to the A/C control head 32 there is a control line 38; connecting the A/C control head to the engine controller 34 there is a control line 40; connecting the engine controller 34 to the compressor 14, there is a control line 42. The control lines 36 and 38 transmit signals from the humidity sensor 28 and temperature probe 30, respectively, to the A/C control head 32.

From the A/C control head 32, signals are transmitted to and between the engine controller 34 via control line 40. The control line 42, between the engine controller 34 and the compressor 14, relays signals between such devices 14, 34 to control the continuously variable swash plate compressor 14. With a humidity sensor 28 placed just before the evaporator 20, the constant, real-time temperature, and loading, or humidity load, on the evaporator 20 can be measured. With a temperature probe 30 placed just after the evaporator 20, the effects of the evaporator 20 on the temperature of air passing through the evaporator 20 can be measured. The humidity of the air exiting the evaporator 20 can also be measured just aft of the evaporator 20.

Traditional flow of a refrigerant through the air conditioning system lines 22, 24, 26 consists of the following. The compressor 14 operates to compress and therefore increase the pressure of a gaseous refrigerant such as R134a. The resulting super-heated refrigerant exiting the compressor 14 via refrigerant line 22 is at an elevated temperature and pressure. The condenser 16 receives the resulting high-temperature, high-pressure refrigerant from refrigerant line 22, and at the condenser 16, heat is conducted to the surface of the condenser 16. Air is forced over the surface of the condenser 16 by either a fan or by the movement of the condenser through the medium in which it travels, usually air when a vehicle travels along a road. Air blown across or through the condenser 16 by a fan or by the condenser traveling through a medium, causes the condenser to release heat to its surrounding environment. This permits the refrigerant within the condenser 16 to become cooler, which causes the refrigerant to condense resulting in relatively low-temperature, high-pressure liquid refrigerant that passes onto the throttling device 18 through refrigerant line 24.

The throttling device 18, which is normally a thermal expansion valve or an orifice tube, operates to control the volume of refrigerant that is discharged to the evaporator 20, which is normally located inside the passenger compartment or at least on the same side of a vehicle fire wall as the passenger compartment. This control of the refrigerant results in a pressure differential across the throttling device 18 that causes the refrigerant delivered to the evaporator 20 to be delivered as a low-temperature, low-pressure gas. Once at the evaporator 20, the gaseous refrigerant transfers heat from inside the evaporator 20 to the air exiting the evaporator 20, the air exiting the evaporator is noted by air flow arrow 48. The exit air flow 48 from the evaporator 20 is cooler than the input air flow 46 that enters the evaporator 20 during normal operation of the air conditioning system 12. The air entering and exiting the evaporator is normally forced using a fan 44 to propel such air, the speed of which is controlled by a user from within the vehicle compartment. This fan 44 is also referred to as a blower.

The A/C control head 32 and the engine controller 34 are used to ultimately control the degree of the stroke of the compressor 14, that is, the angle of the swash plate. The A/C control head 32 receives input from the humidity sensor 28 and the air probe 30. The humidity sensor 28 is located on the air entry side of the evaporator 20 and measures the humidity of the input air flow 46 of the evaporator 20, and is also capable of measuring the temperature of the input air flow 46. The air probe 30 measures the air temperature of the exit air flow 48 of the evaporator 20, and is also capable of measuring the humidity of the air exiting the evaporator 20. The quantities of the humidity sensor 28 and the air probe 30 are sent as a signal through the A/C control head 32 and onto the engine controller 34. Upon receipt of this information, a signal is sent to the compressor 14 to instruct the compressor 14 at what displacement to set its stroke for the compression of the refrigerant. Essentially, the humidity differential across the evaporator is being measured to adjust the displacement of the variable displacement compressor 14.

This setting of the compressor stroke will enable the compressor to begin stroking at precisely the correct stroke, and hence the correct displacement upon compressor activation, to produce the requisite refrigerant mass flow rate to the condenser 16, and subsequently the evaporator 20. Ultimately, the suction pressure of the compressor 14 is set and suction of the refrigerant from the evaporator 20 is controlled to the desired suction pressure.

Now, more detailed, pro-active control of the variable displacement compressor will be explained with reference to the method detailed in FIG. 3. FIG. 3 is a method by which the compressor 14 is controlled through the engine controller 34. Turning to FIG. 3, the method of the teachings of the present invention begins at bubble 60. At block 62, the temperature and humidity of the air is measured at the humidity sensor 30 from the input air flow 46. This temperature and humidity is sent to the engine controller 34 via the A/C control head 32. The purpose and function of the engine controller 34 is to determine and control the compressor displacement volume, while the purpose and function of the A/C control head 32 is to send HVAC control parameters (blower speed, target air temperature, evaporator air probe temperature, mode door position, etc) to the engine controller. Next, the control moves to block 64 where the passenger in the passenger compartment of an automobile 10 sets the desired interior temperature of the automobile cabin. This temperature setting sets the target temperature of the temperature probe 30.

Next, control proceeds to block 66 where the evaporator exit air temperature is read by the temperature probe 30 that is in the exit air flow 48 from the evaporator 20. When control proceeds to block 68, the evaporator suction pressure is measured by pressure sensor 50 on the exit side of the evaporator 20, which is the same as the suction, or intake, side of the compressor 14. For measuring the pressure on the high side of the system 12, which is the side between the compressor 14 and the throttling device 18, there is a pressure sensor 52 installed in the line 22. Proceeding to block 70, the load on the evaporator 20 is calculated according to the following equation:

$$Q_{mass,evap} = (M_{mass,air})(H_{air,in} - H_{air,out})$$

$M_{mass,air}$ is the mass flow rate, normally in (kg/sec or lbs/hr) of air under certain system conditions (i.e. at a particular fan 44 speed). The $M_{mass,air}$ is supplied by the evaporator manufacturer and is retrieved from a lookup table that pertains to the particular evaporator. The lookup table is stored in the A/C control head 32. $H_{air,in}$ is the enthalpy of the air into the evaporator read from the humidity sensor 28, and $H_{air,out}$ is the enthalpy of the air out of the evaporator read in accordance with the target value of the temperature probe 30. The enthalpy of the air is equivalent to the sum of the internal energy of the system plus the product of its volume multiplied by the pressure exerted on the system by its surroundings and has the units of BTU/lbm of dry air (kJ/kg). Additionally, because of the temperature and humidity sensors 28, 30 placed before and after the evaporator, the enthalpy of the air going into the evaporator and the enthalpy of the air coming out of the evaporator are known.

Similarly, the evaporator suction pressure is determined by the following equation:

Evaporator Suction Press.=(Saturation Press.)@(Target Air Probe Temp.−T)

The target air probe temperature is set by the vehicle occupant as the desired vehicle interior temperature, and "T" is a constant obtained from a lookup table provided by the evaporator manufacturer. Additionally, the saturation pressure is obtained from the refrigerant property table. The evaporator suction pressure is determined so that it can be used as an input parameter of Block 72 to calculate the refrigerant flow rate, also know as the mass flow rate.

Block 72 of the control method is the calculation of the mass flow rate of the R134a refrigerant, or applicable refrigerant, which is a function of engine speed, vehicle speed, swash plate compressor angle (control valve current value), discharge and calculated suction pressure. Calculating the refrigerant flow rate at Block 72 is accomplished by the look-up table of the compressor under the calculated suction pressure, measured discharge pressure and compressor RPM. Block 74 represents the control or adjustment of the swash plate angle based upon the compressor speed, the suction pressure just before the compressor, and the discharge pressure just after the compressor.

Figure 4A:
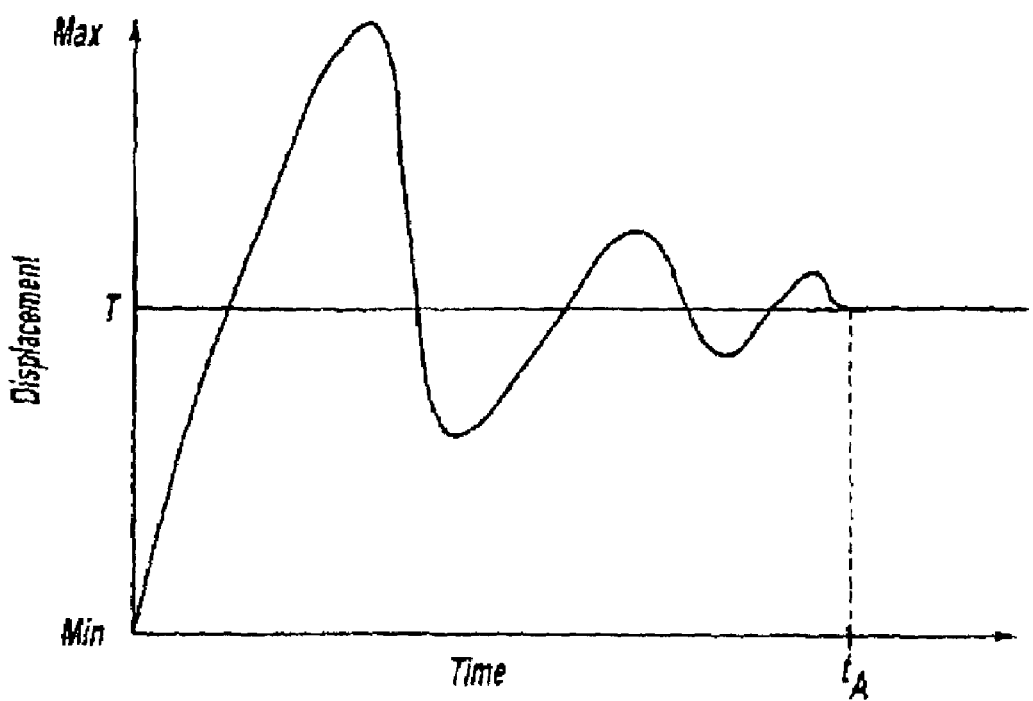
Figure 4B:
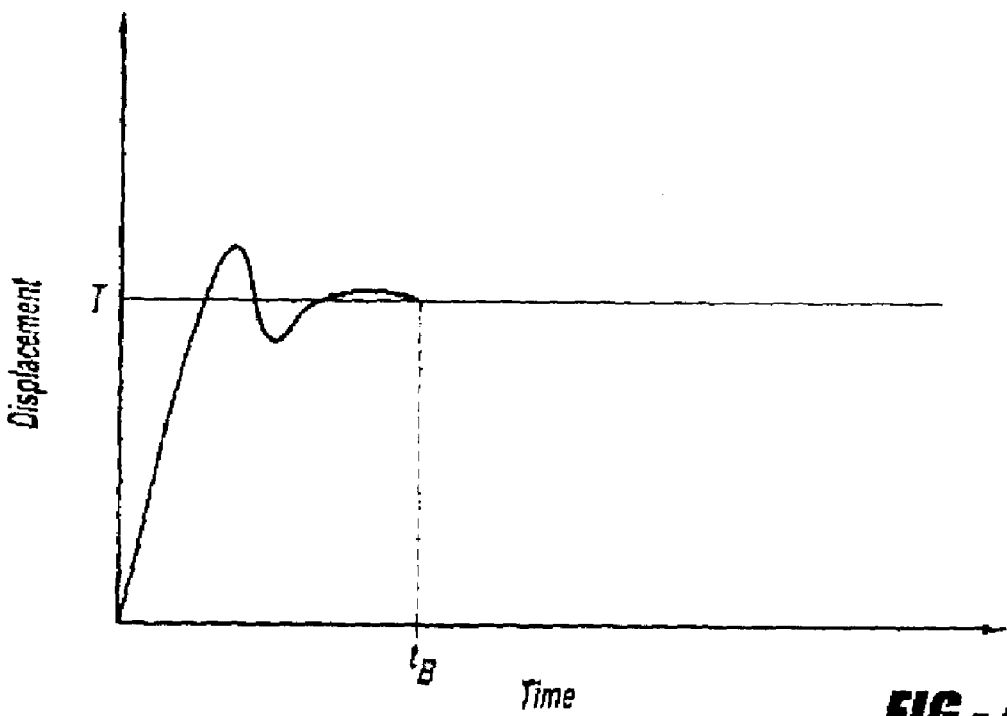

Additionally, in accordance with the teachings of the present invention, adjustment of the compressor displacement is based upon the customer-requested target temperature under different environments such as different ambient temperatures, door mode positions, blower speeds, etc. Knowing the target temperature and evaporator air inlet enthalpy will allow one to calculate how much refrigerant flow rate is needed to meet customer demand. For a given engine rpm, ambient temperature, calculated suction pressure and measured discharge pressure will help in determining the swash plate angle that results in the compressor displacement, thus preventing overshooting of the flow rate with the conventional logic. FIG. 4A depicts typical transient displacement as a function of time for a conventional control system, while FIG. 4B depicts such displacement for the control of the present teachings. T is the target displacement in both FIGS. 4A and 4B. From FIGS. 4A and 4B, one can see that the time necessary to obtain the desired compressor displacement T using the logic of the present invention is much less than that of the conventional logic $t_A$.

Block 76 of the control method proceeds with a "yes" or "no" decision after arriving at the absolute value of the difference between the actual air probe temperature and the desired or passenger-set temperature that is set by a passenger in the passenger compartment of the automobile, and determining whether that absolute value temperature is less than 0.5 degrees Fahrenheit. If the answer within block 76 is "yes" then the stroke of the compressor (angle of the compressor swash plate) is maintained as it is. If the answer is "no" then control iterations are continued until a temperature difference of less than 0.5 degrees Fahrenheit is met.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling displacement in a variable displacement compressor of an automobile air conditioning system, the air conditioning system further including an evaporator and an air probe on the exit side of the evaporator, the method comprising:

providing air conditioner control head parameter settings;
providing an ambient temperature;
providing a measured discharge pressure;
providing an engine RPM;
detecting an actual air temperature of air entering the evaporator and responsively producing an evaporator air-in temperature signal;
detecting an actual humidity level of air entering the evaporator and responsively producing an evaporator air-in humidity signal;
setting a target air temperature of the air probe;
reading an actual air temperature of air exiting the evaporator at the air probe;
calculating a suction pressure at an exit side of the evaporator, wherein calculating the suction pressure at an exit side of the evaporator is based on the target air temperature, a constant obtained from a lookup, table pertaining to the evaporator, and saturation pressure obtained from a refrigerant property table;
calculating a load on the evaporator;
calculating a refrigerant flow rate; and
adjusting an operational state of the refrigerant compressor upon compressor startup, wherein adjusting an operational state of the refrigerant compressor means determining a swash plate angle to affect compressor displacement based in part on a result of calculating the suction pressure.

2. The method of controlling displacement in a variable displacement compressor according to claim 1, wherein the load on the evaporator is calculated by multiplying a mass flow rate of air through the evaporator by a difference between an enthalpy into the evaporator and an enthalpy out of the evaporator.

3. A method of controlling displacement in a variable displacement compressor of an automobile air conditioning system, the air conditioning system further including an evaporator and an air probe on the exit side of the evaporator, the method comprising:

detecting an actual air temperature of air entering the evaporator and responsively producing an evaporator air-in temperature signal;

detecting an actual humidity level of air entering the evaporator and responsively producing an evaporator air-in humidity signal;

setting a target air temperature of the air probe;

reading an actual air temperature of air exiting the evaporator at the air probe;

calculating a suction pressure at an exit side of the evaporator, wherein calculating the suction pressure at the exit side of the evaporator is based on the target air temperature, a constant obtained from a lookup table pertaining to the evaporator, and a saturation pressure obtained from a refrigerant property table;

calculating a load on the evaporator;

calculating a refrigerant flow rate based upon engine speed, vehicle speed, swash plate compressor angle, discharge pressure and calculated suction pressure and measured discharge pressure; and adjusting an operational state of the refrigerant compressor upon compressor startup, wherein the mass flow rate of air through the evaporator is obtained from an evaporator property table.

4. The method of controlling displacement in a variable displacement compressor according to claim 3, further comprising a humidity sensor, wherein the enthalpy into the evaporator is measured by the humidity sensor.

5. The method of controlling displacement in a variable displacement compressor according to claim 4, wherein the enthalpy out of the evaporator is measured by the air probe.

6. The method of controlling displacement in a variable displacement compressor according to claim 1, wherein the refrigerant flow rate is calculated from a compressor look-up table.

7. The method of controlling displacement in a variable displacement compressor according to claim 1, wherein the operational state of the compressor is adjusted by altering the compressor displacement.

8. The method of controlling displacement in a variable displacement compressor according to claim 1, further comprising:

calculating an absolute value of a difference between an actual air probe temperature and the target air probe temperature after adjusting the operational state of the compressor.

9. The method of controlling displacement in a variable displacement compressor according to claim 8, further comprising:

determining if the absolute value is less than a target value.

10. The method of controlling displacement in a variable displacement compressor according to claim 9, wherein the target value is 0.5 degrees Fahrenheit.

11. The method of controlling displacement in a variable displacement compressor according to claim 9, further comprising:

maintaining compressor stroke if the absolute value is less than the target value.

12. The method of controlling displacement in a variable displacement compressor according to claim 1, wherein the temperature of the air entering the evaporator is measured using a temperature sensor.

13. The method of controlling displacement in a variable displacement compressor according to claim 1, wherein the humidity of the air entering the evaporator is measured using a humidity sensor.

14. The method of controlling displacement in a variable displacement compressor according to claim 1, wherein the setting of the target temperature of the interior air probe is performed by a person.

15. A method of controlling displacement in a variable displacement compressor of an automobile air conditioning system, the air conditioning system further including an evaporator and an air probe on the exit side of the evaporator, the method comprising:

providing an ambient temperature;

providing a measured discharge pressure;

providing an engine RPM;

detecting an actual temperature of air entering the evaporator and responsively producing an evaporator air-in temperature signal;

detecting an actual humidity level of air entering the evaporator and responsively producing an evaporator air-in humidity signal;

setting a target temperature of the temperature probe;

reading an actual temperature of air exiting the evaporator at the temperature probe;

calculating a suction pressure at an exit side of the evaporator, wherein calculating the suction pressure at the exit side of the evaporator is based on the target air temperature a constant obtained from a lookup table pertaining to the evaporator, and a saturation pressure obtained from a refrigerant property table;

calculating a load on the evaporator, wherein the load on the evaporator is calculated by multiplying a mass flow rate of air through the evaporator by a difference between an enthalpy into the evaporator and an enthalpy out of the evaporator, wherein the mass flow rate of air through the evaporator is obtained from an evaporator property table;

calculating a refrigerant flow rate based upon engine speed, vehicle speed, swash grate compressor angle. discharge pressure and calculated suction pressure and measured discharge pressure; and adjusting an operational state of the refrigerant compressor upon compressor startup.

16. The method of controlling displacement in a variable displacement compressor according to claim 15, further comprising a humidity sensor, wherein the enthalpy into the evaporator is measured by the humidity sensor.

17. The method of controlling displacement in a variable displacement compressor according to claim 16, wherein the enthalpy out of the evaporator is measured by the air probe.

18. The method of controlling displacement in a variable displacement compressor according to claim 17, wherein the operational state of the compressor is adjusted by altering the compressor displacement.

19. The method of controlling displacement in a variable displacement compressor according to claim 18, further comprising:

calculating an absolute value of a difference between an actual air probe temperature and the target air probe temperature after adjusting the operational state of the compressor;

determining if the absolute value is less than 0.5 degrees Fahrenheit and maintaining compressor stroke if the absolute value is less than the target value and altering the compressor stroke if the absolute value is greater than the target value.

* * * * *